United States Patent [19]
Kordonsky et al.

[11] Patent Number: 5,810,126
[45] Date of Patent: Sep. 22, 1998

[54] ELECTROHEOLOGICAL FLUID COMPOSITE STRUCTURES

[75] Inventors: William Ilyitch Kordonsky; Alina Danilovna Matsepuro; Victor Nesterovich Makatun; Zoja Anatoljevna Novicova; Svetlana Antonovna Demchuk, all of Minsk, Belarus

[73] Assignee: Byelocorp Scientific, Inc., Rochester, N.Y.

[21] Appl. No.: 640,753

[22] PCT Filed: Oct. 26, 1993

[86] PCT No.: PCT/BY93/00006

§ 371 Date: Jul. 22, 1996

§ 102(e) Date: Jul. 22, 1996

[87] PCT Pub. No.: WO95/11956

PCT Pub. Date: May 4, 1995

[51] Int. Cl.$^6$ .................................................. F16F 15/03
[52] U.S. Cl. ........................ 188/267; 188/322.5; 252/570; 267/140.14
[58] Field of Search ..................... 188/267, 268, 188/322.5, 378, 379, 380; 267/140.14, 113, 136; 280/707; 248/550; 252/73, 78.3, 570, 572

[56] References Cited

U.S. PATENT DOCUMENTS

| | | |
|---|---|---|
| 3,309,915 | 3/1967 | McEuen et al. . |
| 3,367,872 | 2/1968 | Martinek et al. ........................... 252/74 |
| 3,552,275 | 1/1971 | Chaney et al. . |
| 4,742,998 | 5/1988 | Schubert ............................... 188/322.5 |
| 4,773,632 | 9/1988 | Hartel .................................. 188/267 X |
| 4,923,057 | 5/1990 | Carlson et al. ......................... 188/378 |
| 5,068,018 | 11/1991 | Carlson ................................ 204/180.1 |
| 5,075,021 | 12/1991 | Carlson et al. ........................... 252/73 |
| 5,547,049 | 8/1996 | Weiss et al. ............................. 188/267 |

FOREIGN PATENT DOCUMENTS

| | | |
|---|---|---|
| 0 087 688 | 9/1983 | European Pat. Off. . |
| 0 361 931 | 4/1990 | European Pat. Off. . |
| 0 395 453 | 10/1990 | European Pat. Off. . |
| 0 427 520 | 5/1991 | European Pat. Off. . |
| 0 549 227 | 6/1993 | European Pat. Off. . |
| 1315312 | of 1963 | France . |

OTHER PUBLICATIONS

Database WPI Derwent Abstract London GB AN 78–79591 & SU–584028 (Vasilenok) 9 Dec. '77.

Primary Examiner—Robert J. Oberleitner
Assistant Examiner—Pamela J. Lipka
Attorney, Agent, or Firm—Kenyon & Kenyon

[57] ABSTRACT

This invention relates to laminated composite structure elements containing electrodes, flexible laminae which may also serve as electrodes, and an electrorheological fluid located between the flexible laminae. The rheological properties of the electrorheological fluid and its cohesive force with solid surfaces may be changed by applying an electric field, and the mechanical properties of the whole laminated composite structure may thereby be varied.

22 Claims, 8 Drawing Sheets

ELECTROHEOLOGICAL FLUID COMPOSITE STRUCTURES

FIELD OF THE INVENTION

The present invention relates to a composite structure having two or a plurality of layers and containing an electrorheological fluid and, more particularly, to an improved composite structure element which allows the complex shear modulus of the composite element to differ for different sections of the composite element.

BACKGROUND OF THE INVENTION

In electrorheological fluid composite structures, creating an electric field in each layer of the electrorheological fluid can change the mechanical properties of the composite structure as a whole. In the presence of an electric field the flexibility and stiffness of an electrorheological fluid composite system, such as a plate, panel, or beam, are changed; the amplitude of flexibility or bending is decreased, and the damping properties are altered.

In electrorheological fluid composite structures, the foundation of the laminated composite structure is a composite element which consists of two metal flexible laminae or two non-metal layers having an electrically conducting coating and serving as electrodes. A spacing between these layers is filled with an electrorheological fluid. When an electric potential is created between the electrodes, the dispersed phase of electrorheological fluid forms a bridge structure which connects the electrodes. In the presence of an electric field, the cohesive strength between particles in the electrorheological fluid and between the fluid particles and the electrode surfaces is increased, as compared with the cohesive strength with no electric field. In the presence of an electric field, the rheological properties of the electrorheological fluid layer between the electrodes change; its viscosity and yield stress are increased, visco-elastic properties appear, and the cohesive force between the particles and electrodes grows. When voltage is supplied to the electrodes of a deformed composite element, the complex shear modulus, $G^* = G' + iG''$, is varied, including its real part $G'$ (elasticity modulus), imaginary part $G''$ (loss modulus) and loss factor $G''/G'$. As a result, the energized composite structure exhibits improved damping properties over a frequency range which is dependent on the design of the composite element and its bending stiffness.

In the composite element described, it is difficult to maintain a relatively constant spacing between the electrode surfaces when the composite element is deformed. If the spacing is decreased too much, a short circuit of the electrodes may occur. This inability to avoid short circuits causes relatively low reliability in prior composite elements. The fluid in prior systems may also escape from the interspace of the composite element unless the fluid layer is confined by a barrier.

Carlson, U.S. Pat. No. 4,923,057, discloses an electrorheological composite structure consisting of an electrorheological fluid layer confined by a barrier and located between two electrically conductive flexible layers. Carlson attempts to maintain the uniformity of the electrorheological fluid layer thickness, and corresponding separation of the electrodes, by pasting insulating pads between the electrodes at designated positions, such as around the perimeter of the element. In an effort to prevent a short circuit of the electrodes, Carlson discloses that a layer of a fabric or other porous or mesh material is placed between the electrodes.

In a composite element according to the Carlson patent, the spacing between the flexible laminae must be increased by the fabric thickness, and the voltage must therefore be elevated in order to maintain a required field strength. In addition, optimal properties of such a pad are unknown; for example, use of an insulating fabric reduces the area of the bridge structures formed by the electrorheological fluid that connect the electrodes, and the effect of the electric field on the mechanical properties of the electrorheological fluid will be diminished.

The Carlson patent also describes the use of an electrorheological fluid which tends to migrate from its desired position. To prevent escape of the fluid from the spacing between the flexible laminae, a barrier is used to seal the composite element edges. The substances used for sealing these edges affect the mechanical properties of the laminated composite element. The presence of a sealing layer is an additional damping, non-controlled factor that decreases the interval of dynamic electrorheological fluid-controlled stiffness.

OBJECTS AND SUMMARY OF THE INVENTION

It is an object of the invention to provide a composite element, including an electrorheological fluid under an electric field.

It is a further object of the invention to provide a composite element including an electrorheological fluid having a reduced probability of a random short circuit of electrodes when the composite element is deformed.

It is a further object of the invention to provide a composite element including an electrorheological fluid wherein the element possesses different values of the elasticity and loss moduli in different sections of the same composite element.

It is a further object of the invention to provide a composite element, including an electrorheological fluid having an increased cohesion between the electrorheological fluid and the flexible laminae surface under an electric field.

It is a further object of the invention to provide a composite element including an electrorheological fluid which prevents the electrorheological fluid from flowing out of the interspace of the composite element.

These and other objects of the invention are achieved by a composite element comprising a first flexible lamina, a second flexible lamina, an electrorheological fluid positioned between the first flexible lamina and the second flexible lamina, and a plurality of electrodes mounted on the first flexible lamina adjacent to the electrorheological fluid. These and other objects may alternately be achieved by a composite element comprising a plurality of flexible electrically conductive laminae which serve as electrodes and an electrorheological fluid positioned between the flexible laminae, wherein the surfaces of the flexible laminae that contact electrorheological fluid have an oxide film.

DETAILED DESCRIPTION OF THE PREFERRED EMBODIMENTS

Figure 1:
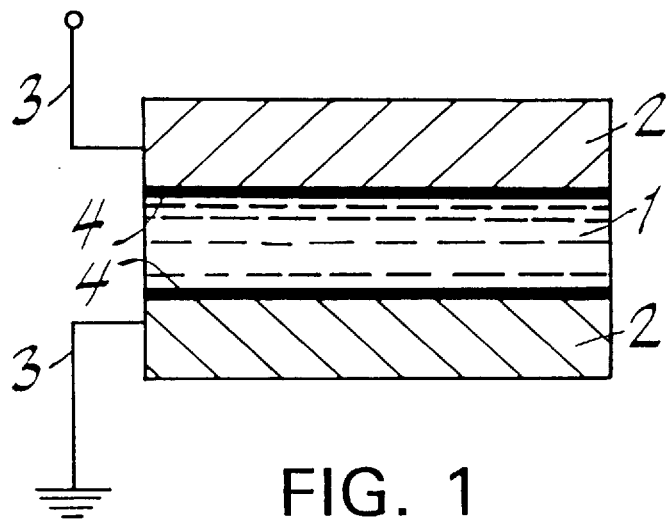
FIG. 1 is a cross-sectional view of a laminated composite element of the present invention.

Laminated composite elements according to the present invention comprise two or more electrodes, flexible laminae, which may also serve as electrodes, and a layer of electrorheological fluid between the flexible laminae. The composite elements may be of any desired size, shape or curvature, and the component layers of electrorheological fluid, flexible laminae, and electrodes may be arranged in numerous ways, such as in the embodiments described in further detail below.

Values of the dynamic moduli of composite elements can depend on the mechanical properties of the component flexible layers, the combination of flexible layers, the strength of cohesion between electrorheological particles, and the cohesion of the electrorheological particles with the flexible layer surfaces in an electric field, as well as on the dynamic electrorheological fluid properties. In deforming electrorheological fluid composite elements, shear stresses appear both within the electrorheological fluid and at the electrorheological fluid-electrode interface. It is therefore desirable that the shear strength within the fluid and between the fluid and the electrode be relatively the same.

The preferred electrorheological fluid of the present invention comprises (a) a dispersed phase comprising at least two types of particles, each preferably coated with an activator; (b) a surfactant; and (c) a carrying fluid. High values of the initial dynamic moduli and a large range of the moduli of electrorheological fluid may be attained by using a particularly preferred fluid suspension, comprising laminated crystal hydrate particles, such as bentonite clay or chromium dihydrotripolyphosphate, AEROSIL ($SiO_2$) particles, glycerol monooleate ($C_{17}H_{33}COOCH_2.CHOH.CH_2OH$) as a surfactant-fluidizing agent, and vacuum mineral oil as a carrying medium. It is particularly preferred that the crystal hydrate particles comprise about 10 to 55% by weight of the fluid if bentonite clay is used, and 50 to 65% by weight of the fluid if chromium dihydrotripolyphosphate is used. In a more preferred embodiment, the crystal hydrate particles comprise about 50 to 55% by weight of the fluid if bentonite clay is used, and 58 to 65% by weight of the fluid if chromium dihydrotripolyphosphate is used.

The dispersed phase of an electrorheological fluid of the present invention most preferably is a mixture of AEROSIL particles, and one or more types of particles selected from the group consisting of natural and synthetic laminated crystal hydrate particles.

The AEROSIL particles useful in the invention are non-porous spherical silicon dioxide particles. The AEROSIL particles create a thixotropic matrix in the electrorheological fluid. In a preferred embodiment, the specific particle surface area is 300 to 380 $m^2/g$ and the distribution of the particle size is 0.005 to 0.015 $\mu$m. AEROSIL particles manufactured by Degussa AG, Frankfurt, Federal Republic of Germany, are particularly preferred. AEROSIL A-380, with a specific particle surface area of 380 $m^2/g$, is particularly preferred. An activator can be adsorbed on the AEROSIL particle surface. Polyethylene polyamine, such as that which is produced in Russia and meets specifications No. TU6-02-594-85, is preferred as an activator. The activator preferably amounts to about 20 to 30% by weight of AEROSIL.

The preferred polyethylene polyamine activator is comprised mainly of diethylenetriamine, triethylenetetramine, and tetraethylenepentamine with a chemical structure of: $H_2N(CH_2CH_2NH)_nH$, where n is an integer of from 1 to 5. The color of the activator normally is from light yellow to yellow-brown. The self-ignition point is about 356° C. The flash point is about 104° C. The density is about 0.95 to 1.05 $g/cm^3$. The viscosity is less than or equal to about 0.9 Pa.s. The mass fraction of ternary amine groups is about 3 to 5%. The mass fraction of total nitrogen is no less than about 30%. The mass fraction of water is no more than about 2%.

The second type of particles in the dispersed phase of an electrorheological fluid according to the present invention is natural or synthetic laminated crystal hydrate. Bentonite clay is a particularly preferred natural laminated crystal hydrate. Chromium dihydrotripolyphosphate is a particularly preferred synthetic laminated crystal hydrate. Both crystals can be used in the same fluid. In an alternate embodiment, metal oxides (e.g., $CrO_2$, $Co_3O_4$, $V_2O_5$) and polymers may be used instead of natural or synthetic laminated crystal hydrate.

If bentonite clay is used, the particle size should be about 1 to 10 $\mu$m, and the clay preferably contains bound crystal water as an activator. In a preferred embodiment, the bound crystal water amounts to about 9% by weight of the bentonite clay. The bentonite clay may also contain another activator, such as polyethylene polyamine. In a preferred embodiment, the bound crystal water amounts to about 8 to 9% by weight of the bentonite clay, and polyethylene polyamine is adsorbed on the bentonite clay to about 3 to 10% by weight of bentonite clay.

Where chromium dihydrotripolyphosphate is used as the crystal hydrate in the dispersed phase, the particle size should be about 1 to 10 $\mu$m, and the chromium dihydrotripolyphosphate preferably contains crystal water as an activator. The crystal water preferably is present in an amount of about 3 to 9% by weight of the chromium dihydrotripolyphosphate. In a particularly preferred embodiment, the crystal water preferably is present in an amount of about 7 to 9% by weight of the chromium dihydrotripolyphosphate.

The surfactant present in the electrorheological fluid aids in maintaining the flow of electrorheological fluid at high particle concentration. In a preferred embodiment, the surfactant is glycerol monooleate. Oleic acid or other suitable surfactants may also be used as the surfactant.

The electrorheological fluid of the invention also contains a carrying medium in which the particles of the electrorheological fluid are suspended. In a preferred embodiment, the carrying medium used is a mineral vacuum oil. A trademarked mineral vacuum oil, VM-3 (under Russian trademark), is particularly preferred. VM-3 is produced in Russia according to specifications TU 38.401.58.3-90. Other mineral insulating fluids can also be used as the carrying medium.

The vacuum oil VM-3 produced according to specifications TU 38.401.58.3-90 is a well-refined mineral oil with narrow fractions, small evaporability, and good stability with respect to oxidation. Its appearance is that of a transparent, colorless fluid. The viscosity of VM-3 at 50° C. is about 8 to 11 cSt. The flash point in an open crucible is about 150° to 180° C. The acid number is no more than about 0.3 mg KOH/g.

A preferred embodiment of the electrorheological fluid of the present invention comprises 10 to 55% by weight of the fluid of bentonite clay, 9 to 35% AEROSIL particles, 8 to 17% polyethylene polyamine, 18 to 27% vacuum oil VM-3, and 4 to 13% glycerol monooleate. A particularly preferred embodiment of this embodiment of the electrorheological fluid comprises 50 to 55% by weight of the fluid of bentonite clay, 9 to 11% AEROSIL particles, 8 to 12% polyethylene polyamine, 20 to 25% vacuum oil VM-3, and 4 to 6% glycerol monooleate. An alternate preferred embodiment of the electrorheological fluid of the present invention comprises 50 to 65% by weight of the fluid of chromium dihydrotripolyphosphate, 6 to 15% AEROSIL, 1 to 5% water, 2 to 5% polyethylene polyamine, 15 to 19% vacuum oil VM-3, and 4 to 8% glycerol monooleate. A particularly preferred embodiment of this alternate embodiment of the electrorheological fluid comprises 58 to 65% by weight of the fluid of chromium dihydrotripolyphosphate, 7 to 9% AEROSIL, 1 to 5% water, 2 to 3% polyethylene polyamine, 16 to 18% vacuum oil VM-3, and 4 to 6% glycerol monooleate.

The electrorheological fluid of the present invention may be prepared in the following manner.

AEROSIL as received in its delivered form is used in the preparation of the electrorheological fluid. Before processing the AEROSIL by the activator, an initial amount of AEROSIL is taken and weighed. The required mass of the activator, polyethylene polyamine, corresponding to 20 to 30% by weight of AEROSIL is calculated. The required amount of polyethylene polyamine is then weighed and dissolved in distilled water, and the AEROSIL is wetted with the polyethylene polyamine solution. The amount of distilled water should be chosen so that the entire AEROSIL sample may be wetted without any excess solution. The AEROSIL and the polyethylene polyamine solution should be carefully mixed, and the mixture should be kept in a closed vessel for at least about 8 hours at room temperature, followed by about 3 hours at about 50° C., then cooled in the closed vessel to room temperature. The mixture should then be spread out over a surface, such as a pan, in the form of a layer not more than about 1 cm thick, and air dried at room temperature.

Bentonite clay should be washed out by distilled water to remove impurities, dried in the air, ground to 1 to 10 µm particles in size, and sifted. It can then be processed using polyethylene polyamine in a similar manner to that described for AEROSIL.

Chromium dihydrotripolyphosphate powder can be kept above a buffer solution at a constant moisture content in a closed vessel to provide the crystal water content, amounting to about 3 to 9% by weight. In a preferred embodiment, the crystal water content may amount to about 8 to 9% by weight. The chromium dihydrotripolyphosphate powder adsorbs water from the air, amounting to 11% by weight. To obtain the moisture content of up to 3 to 9% by weight, the powder must be dried at 50° to 70° C. To determine how much crystal water is in the particles, the powder portion is weighed, dried at a temperature of 100° C. until its weight is constant, and then it is weighed again. The water content in both chromium dihydrotripolyphosphate and in pure bentonite clay is determined in terms of a dry residual after 100° C. drying.

After undergoing polyethylene polyamine processing, as described above, the AEROSIL and bentonite clay powders with the adsorbed activator are preferably ground up to 1 to 10 µm particle size and sifted.

Where glycerol monooleate is employed as the surfactant, it may be prepared by condensing glycerol and oleic acid at a 1.1:1 molar ratio. In a suitable preparation procedure, glycerol and oleic acid are immersed into a three-neck flask with a mixer, direct expansion cooler and a thermometer. A catalyst, such as sulfuric acid, is added to the glycerol/oleic acid mixture, amounting to about 0.1% by weight of the total mixture. The mixture is then heated to about 100° C. in a sand bath, and the temperature is maintained relatively constant until substantially all water is removed through the direct expansion cooler. The removed water is formed due to condensation of glycerol and oleic acid. The mixture temperature should then be increased to approximately 120° C. and maintained for about 1 hour, and then increased to approximately 140° C. and maintained for about 1 hour. The mixer should operate continuously throughout this process. The mixture is then cooled and, upon cooling, the reaction product is washed out, by means of a separating funnel, with distilled water until there are no acid traces in the washing water (i.e., until the washing water is neutral). The glycerol monooleate product is then dried by heating it to about 140° C. in an evaporating dish.

To prepare the electrorheological fluid, the AEROSIL particles, crystal hydrate particles, glycerol monooleate and mineral vacuum oil are first weighed. The ingredients are mixed and rubbed to a paste-like condition in ceramic utensils. Preferably, a porcelain mortar is used for mixing and rubbing the ingredients. It is particularly preferred that the electrorheological fluid and its ingredients not contact metals during the preparation process.

In a preferred mixing of the components of the electrorheological fluid, first, a mortar is filled with the sample of activated AEROSIL. Glycerol monooleate is dissolved in the vacuum oil VM-3. The AEROSIL is carefully rubbed by gradually adding a portion of the solution of glycerol monooleate in vacuum oil VM-3 to obtain a paste. While rubbing the mixture of the AEROSIL, vacuum oil, and glycerol monooleate continuously, small portions of activated bentonite clay and/or chromium dihydrotripolyphosphate particles and the solution of glycerol monooleate in vacuum oil are added. Upon adding each portion of the particles, the mixture is rubbed to obtain a fluid medium. The rubbing process preferably should be intensive and preferably proceeds for about 4 to 8 hours.

The electrorheological fluid must be rubbed to a fluid state before it is applied to the flexible laminae of a composite element. Air bubbles preferably are not present in the electrorheological fluid.

The probability of a random short circuit in a composite element formed using a fluid of the invention can be reduced by introducing coarse particles or fibers of a high electric resistance dielectric into the electrorheological fluid. The particles preferably are relatively uniformly sized, and are randomly distributed in the electrorheological fluid. The particles can hinder the flexible laminae from becoming too close to one another and provide a minimum spacing between the flexible laminae. The electrorheological fluid containing coarse particles can be placed between any suitable flexible laminae. Where metal laminae are employed, it is particularly preferred that coarse particles be included in the fluid. When using metal flexible laminae, preliminarily calibrated and dried spherical polymer or ceramic particles may be introduced into the electrorheological fluid, if desired, directly before applying the fluid to the flexible layers. Suitable particles include polyethylene, mineral glass, and ceramic insulators, and preferably are about 30 to 200 µm in diameter. The particles may amount to about 0.01 to 0.5% by weight of the electrorheological fluid.

Electrorheological fluids of the present invention can be employed between the laminae of composite structures without the need for a surface barrier to prevent leakage from the edge of the structure. Without wishing to be bound by theory, it is believed that the plasticity (yield stress) of the fluid composition provides the electrorheological fluid with sufficient stability to prevent significant fluid leakage from the structure. Such an arrangement has several advantages. Manufacturing the composite is easier and more economical without the need for a fluid barrier. Additionally, abolishing the fluid barrier eliminates influence of the barrier on the initial rigidity and flexibility of the composite material. This allows for more precise control of the properties of the composite material.

FIGS. 1 through 8 show several embodiments of the present invention. Each of the embodiments described comprises at least one layer of electrorheological fluid, two or more electrodes, and a plurality of flexible laminae, which may also serve as electrodes.

FIG. 1 shows a composite element according to the present invention comprised of a layer of electrorheological fluid 1 interposed between flexible laminae 2. In FIG. 1, each of the flexible laminae 2 serve as solid electrodes which are connected to different poles of a power supply 3. The flexible laminae, or electrodes, 2 may be made of any electrically conductive material, such as a metal, with aluminum or aluminum alloys being particularly preferred.

Coating metal electrode and metal flexible layer surfaces with an oxide film reduces the probability of a random short circuit. In a preferred embodiment, the electrode is fabricated from aluminum or its alloys, and the surface is coated with a layer of aluminum oxide by solid anodizing. The strength of cohesion between the electrorheological fluid 1 and the flexible layers 2 in an electric field is also increased when the metal surface is coated with an oxide film. In FIG. 1, the electrodes 2 are coated with an oxide film 4.

Figure 2:
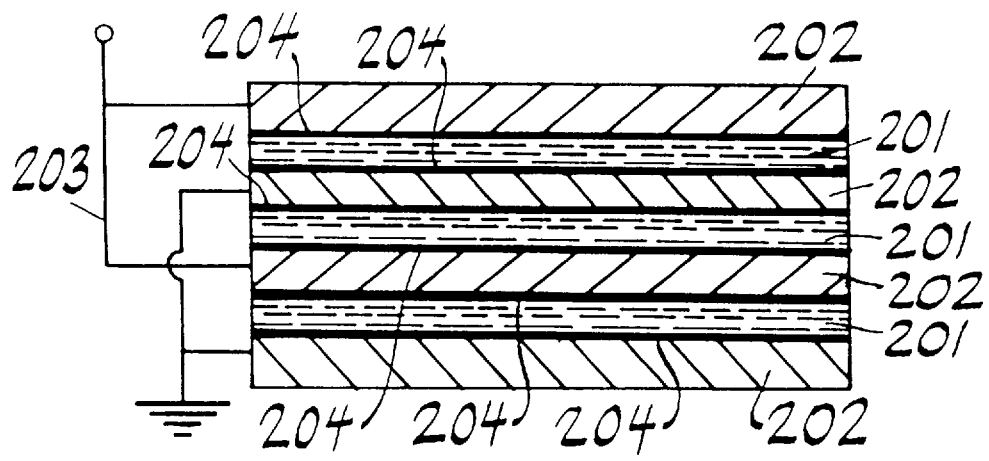
FIG. 2 is a cross-sectional view of another embodiment of the laminated composite element of the present invention.

FIG. 2 shows a composite element comprising more than one layer of electrorheological fluid 201, each of which is interposed between flexible laminae 202. In FIG. 2, as in FIG. 1, the flexible laminae 202 are solid electrodes which are connected to different poles of a power supply 203. The electrodes 202 are coated with an oxide film 204 as shown in FIG. 2.

Figure 3:
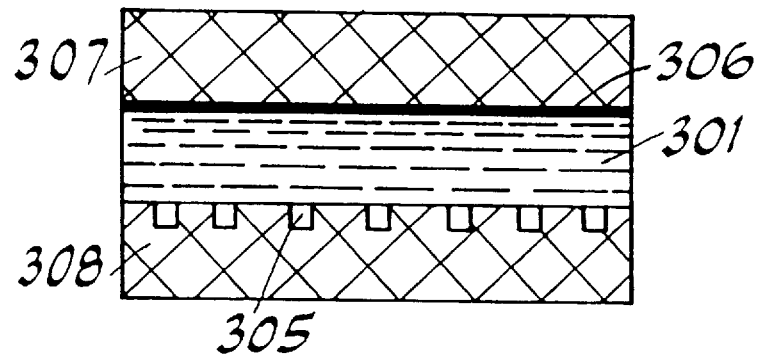
FIG. 3 is a cross-sectional view of another embodiment of the laminated composite element of the present invention.

An alternate embodiment of the composite element of the invention is shown in FIG. 3. In FIG. 3, the element is composed of two dielectric flexible laminae 307 and 308. Alternating electrodes 305 are affixed on the surface of one of the dielectric flexible lamina 308. Alternating electrodes are subdivided into two groups: even electrodes are connected with one pole of the voltage supply source and odd ones, with the other pole. In this embodiment, the second dielectric flexible lamina 307 has no electrodes, and a layer of electrorheological fluid 301 is interposed between dielectric flexible laminae 307 and 308. Using alternating electrodes fixed on a flexible layer adjacent to the electrorheological fluid reduces the probability of a random short circuit in a composite element. Subdividing the alternating electrodes into sections having no less than two electrodes and connecting these sections with different voltage sources allows different mechanical moduli to be obtained on individual sections of one composite element.

The surface of the dielectric flexible lamina 307 on which no electrodes are located is coated with an antistatic varnish 306 to provide the cohesion of this lamina to the electrorheological fluid under electric field. Cohesion in an electric field between an electrorheological fluid and a metal surface, whether coated with an oxide film or non-coated, can also be increased when the surface is coated with an anti-static varnish layer.

Figure 4:
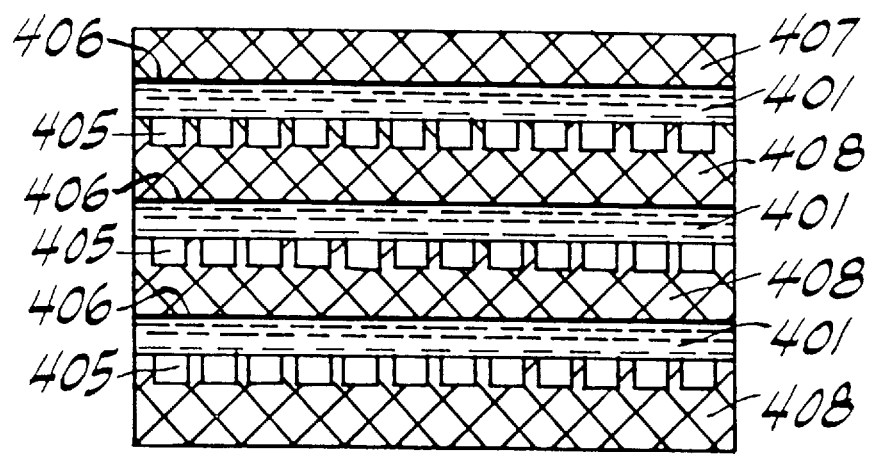
FIG. 4 is a cross-sectional view of another embodiment of the laminated composite element of the present invention.

The embodiment shown in FIG. 4 is similar to the embodiment shown in FIG. 3. In FIG. 4, the composite element is composed of layers of dielectric flexible laminae 407 and 408. Alternating electrodes 405 are affixed on an internal surface of one or more of the dielectric flexible laminae 408. In the embodiment shown in FIG. 4, no electrodes are affixed to the other surface of the dielectric flexible laminae 408. A layer of electrorheological fluid 401 is interposed between the surface of one dielectric flexible lamina 408 on which the electrodes 405 are located, and the surface of another dielectric flexible lamina 408 on which no electrodes are located. The surfaces of the dielectric flexible laminae 407 and 408 on which no electrodes are located may be coated with an antistatic varnish 406.

Figure 5:
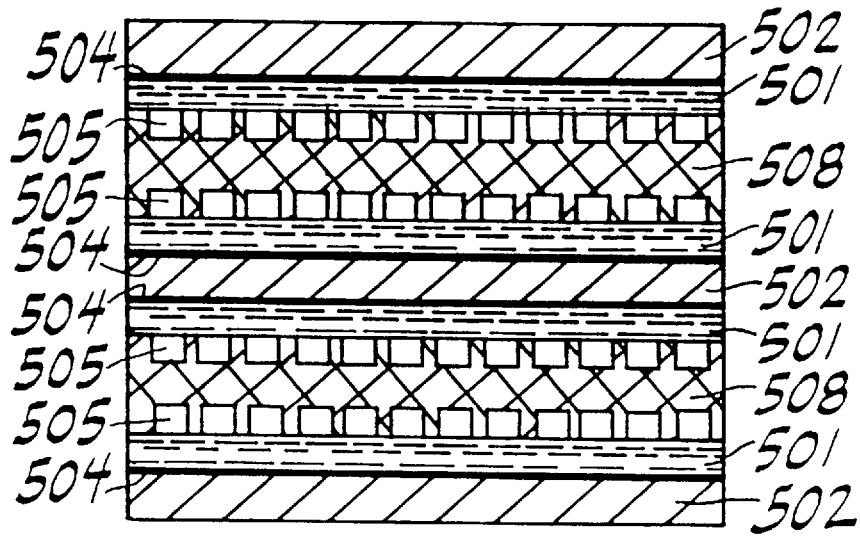
FIG. 5 is a cross-sectional view of another embodiment of the laminated composite element of the present invention.

FIG. 5 shows a composite element which comprises one or more dielectric flexible laminae 508 and one or more metal flexible laminae 502. Dielectric flexible laminae 508 are fabricated from a dielectric with a specific surface electrical conductivity not more than $10^{-16}$ $\Omega^{-1}$ $m^{-1}$, a specific volume resistance not below $10^{14}$ $\Omega.cm$, and electric strength not less than about 18 kV/mm. Laminae 308, 408, 608, 708, and 1008 depicted with FIGS. 3, 4, 6, 7 and 10 preferably also meet these criteria. Dielectric flexible laminae 307, 407, 607, 707, and 1007 depicted with FIGS. 3, 4, 6, 7 and 10 are electrode-free, and preferably are made from non-metal materials having a specific bulk conductivity not higher than $10^{-10}$ $\Omega^{-1.}$ $m^{-1}$ and which are wetted with an antistatic varnish. Referring again to FIG. 5, alternating electrodes 505 are affixed on both the upper and lower surfaces of the dielectric flexible laminae 508. In this embodiment, a layer of electrorheological fluid 501 is interposed between a dielectric flexible lamina 508 and a metal flexible lamina 502. The metal flexible laminae 502 may be coated with an oxide film 504 as shown in FIG. 5.

Figure 6:
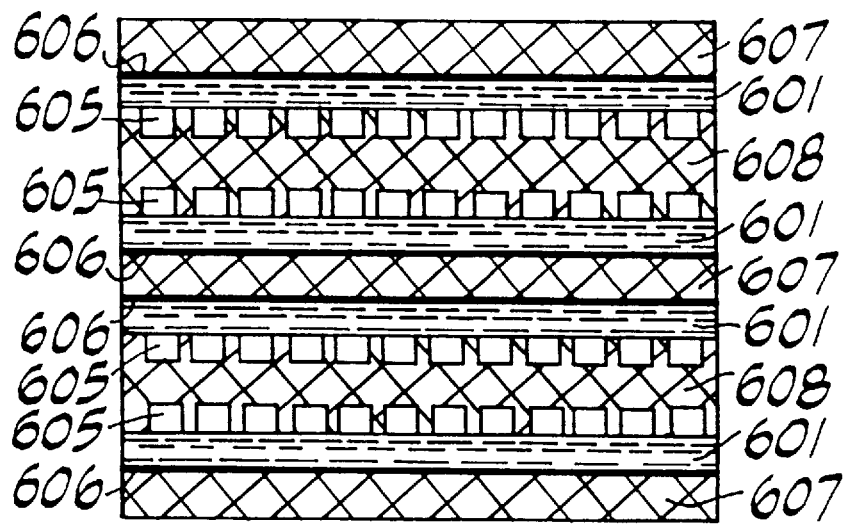
FIG. 6 is a cross-sectional view of another embodiment of the laminated composite element of the present invention.

Referring to FIG. 6, a composite element is shown which comprises one or more dielectric flexible laminae 607 and corresponding dielectric flexible laminae 608. Alternating electrodes 605 are affixed on both the top and bottom surfaces of the dielectric flexible laminae 608. A layer of electrorheological fluid 601 is interposed between a dielectric flexible lamina 607 and a dielectric flexible lamina 608. The dielectric flexible laminae 607 must be coated with an antistatic varnish 606.

Figure 7:
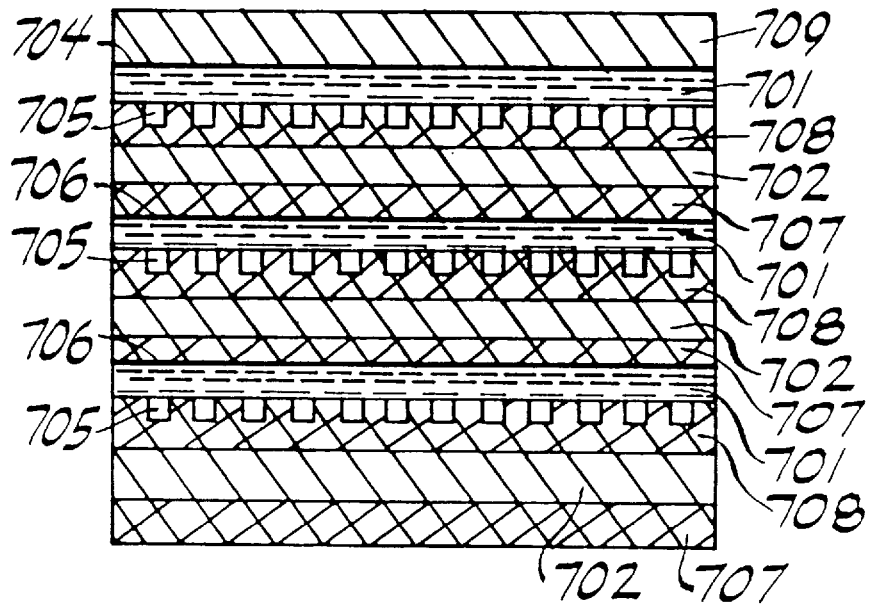
FIG. 7 is a cross-sectional view of another embodiment of the laminated composite element of the present invention.

FIG. 7 shows a composite element comprising one or more metal flexible laminae 702. Lamina 702 is coated with a layer of dielectric 708 on one side. Alternating electrodes 705 are fastened to lamina 708. Metal flexible lamina 702 is coated with a layer of dielectric 707 on the other side, which is coated with a layer of antistatic varnish 706. A flexible lamina 709 may be fabricated from metal and coated with an oxide film 704, or it may be fabricated from a dielectric lamina 707 and coated with a layer of antistatic varnish 706.

To manufacture a composite element of the invention, an electrorheological fluid as described above can be applied in a thin, uniform layer to the top surface of a first lower flexible lamina and the bottom surface of a second upper flexible lamina. The first and second flexible laminae can be joined such that electrorheological fluid layers are located between the laminae and become a continuous fluid layer. Assembling a composite element of slightly curved flexible laminae, preferably is accomplished by gradually joining the laminae to exclude gas bubble flow into electrorheological fluid between the laminae.

Electrodes for use in this invention should be chosen to allow an electric field strength of up to $10^7$ V/m. Selection of the electrode material depends upon the composite element design. For a design which uses flexible laminae which are at the same time solid electrodes, such as 2, 202, 502, 702, and 710 shown in FIGS. 1, 2, 5 and 7, the electrodes are preferably made of aluminum or aluminum alloys. In such designs it is preferable to coat the surface of the electrodes with an oxide film 4 by known methods, such as by anodizing the laminae, as is described below.

Figure 8:
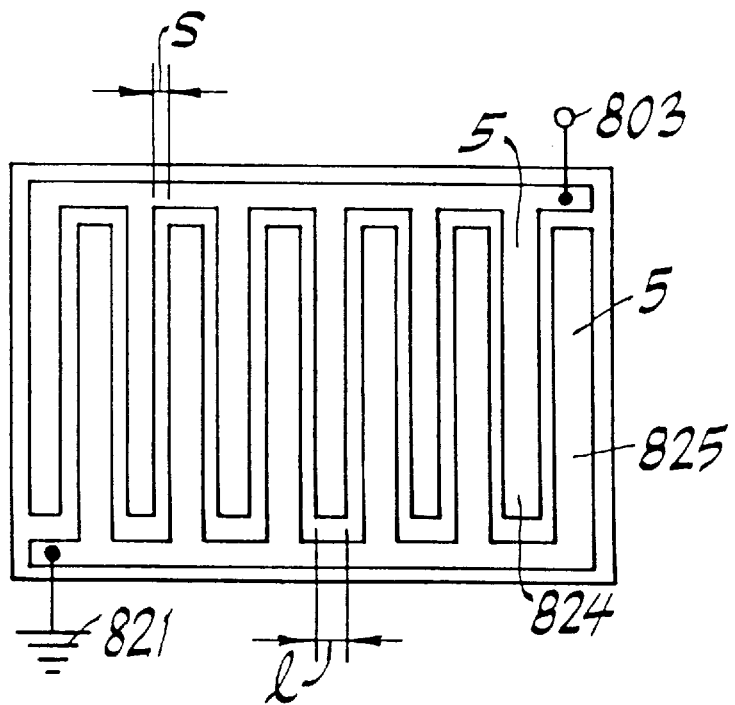
FIG. 8 is a top plan view of an alternating electrode element of the present invention.
Figure 9:
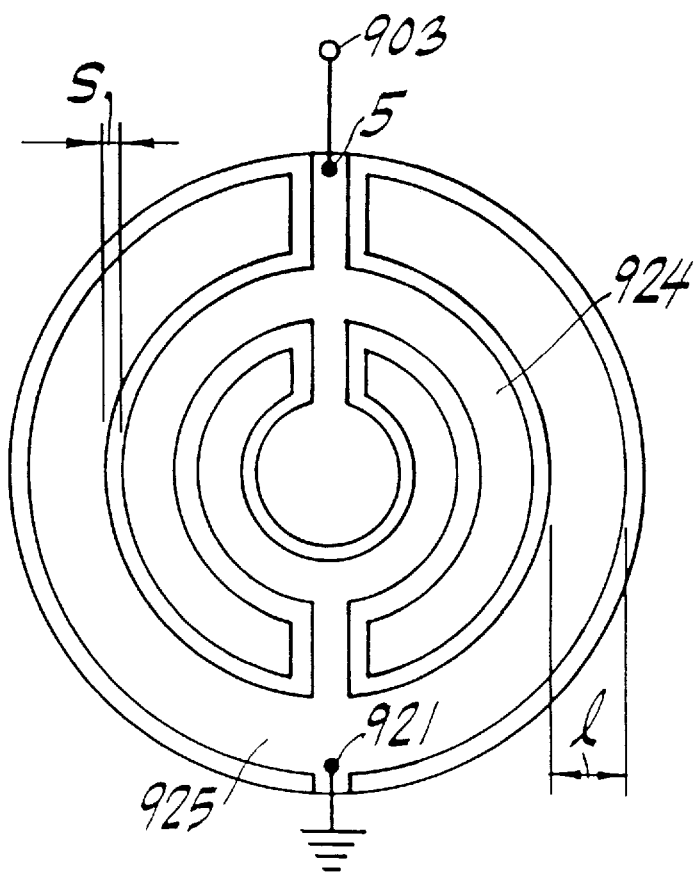
FIG. 9 is a top plan view of an alternate embodiment of the alternating electrode element of the present invention.

The alternating electrodes 5 shown in FIGS. 3, 4, 5, 6, and 7 may be rectangular bands, as shown in FIG. 8, annular concentric bands, as shown in FIG. 9, or other suitably shaped bands. Even electrodes 824, 924 are connected with a power source 803, 903, and odd electrodes 825, 925 are grounded to ground 821, 921. The electrode width, denoted as λ in FIGS. 8 and 9, preferably is 0.7 to 4 mm and may vary along the electrode. In a preferred embodiment, the electrode width is 1 to 4 mm. The spacing width between the electrodes, denoted as "s" in FIGS. 8 and 9, preferably is the same along the entire electrode, within an accuracy up to about 0.05 mm. Preferably the spacing between the electrodes is about 0.7 to 2 mm. In a preferred embodiment, the spacing between the electrodes is about 1 to 2 mm. The ratio of the electrode area to the total area occupied by the lamina comprising the alternating electrodes should be within 0.5 to 0.7. In a preferred embodiment, the ratio of the electrode area to the total area occupied by the lamina comprising the alternating electrodes should be within 0.65 to 0.7.

For designs using alternating electrodes 5, such as those shown in FIGS. 3, 4, 5, 6, and 7, if the electrode-free flexible lamina is constructed of dielectric material 7, the alternating electrodes may be fabricated from any suitable metal. Steel, aluminum and its alloys, titanium, nickel, chromium, and silver are preferred materials for the electrodes 5. Use of copper and its alloys has been found to be not desirable for use with the electrorheological fluid to be applied in this invention.

For a design using alternating electrodes 5 and second flexible metal laminae 2, such as shown in FIGS. 5 and 7, it is desirable to manufacture the alternating electrodes and second flexible laminae from aluminum and its alloys.

Electrodes and flexible laminae of aluminum or aluminum alloys may be coated with a 10 to 15 μm thick oxide layer 4, as shown in FIGS. 2, 5, and 7, preferably by using a solid anodizing method. The oxide coating preferably can be impregnated with a hydrophilic substance such as a dye solution. The oxide layer also is preferably impregnated with an antistatic varnish. The antistatic varnish can be applied to the oxide coating after it has been impregnated with a dye solution.

In composite elements of the present invention, the flexible laminae may be made of any metal or dielectric, except mosaic-conduction materials, depending upon the desired structure. Mosaic-conduction materials, such as a dielectric with conducting inclusions on its surface, are not desirable for use.

In FIGS. 3, 4, 5, 6, and 7, the dielectric flexible laminae 8 are fabricated from a dielectric with a specific surface electrical conductivity not more than $10^{-16}$ $\Omega^{-1}$ $m^{-1}$, a specific volume resistance not below $10^{14}$ Ω.cm, and electric strength not less than 18 kV/mm. Alternating electrodes 5 may be pasted or dusted onto the base 8. The electrodes 5 must be flush with the dielectric spacing surface. The electrode thickness should be such that the total resistance for the alternating electrodes connected to each pole of the supply source does not exceed 100 Ohms.

For a design using alternating electrodes 5 and electrode-free dielectric flexible laminae 7, such as 307, 407, 607, 707, and 1007 shown in FIGS. 3, 4, 6, 7, and 10, non-metal materials having a specific bulk conductivity not higher than $10^{-10}$ $\Omega^{-1}\cdot m^{-1}$ which are wetted with an antistatic varnish may be used as a dielectric. Polycondensating polymers, such as phenolic plastics, aminoplastics, and polyurethane, or polymerizing polymers and plastic masses, or insulating ceramics may also be used as a dielectric in these designs. Polyethylene and polytetrafluoroethylene are difficult to use because of bad adhesion of the antistatic varnish to the surfaces of these polymers.

Dielectric flexible laminae, such as 307, 407, 607, 707, and 1007 shown in FIGS. 3, 4, 6, 7, and 10, may be covered with a 10 to 20 μm thick layer of an antistatic varnish 6 having a specific surface electric resistance of about $10^8$ to $5 \times 10^{10}$ Ohm. The antistatic varnish used in the present invention comprises an antistatic component, a film-forming agent, and a solvent. A polymeric sulfonic acid, such as polyacrylamide isobutenyl sulfonic acid, $[CH_2=CHCO(NH)C(CH_3)_2CH_2SO_3H]_n$, or polystyrene sulfonic acid, $[CH_2-CH(C_6H_4)SO_3H]_n$, serves as the antistatic component. Polymethacrylic acid $-[CH_2-C(CH_3)(COOH)]_n-$ can serve as the film-forming agent. Co-polymers of the polyacrylamide isobutenyl sulfonic acid and polymethacrylic acid $-[CH_2-CHCO(NH)C(CH_3)_2(CH_2SO_3H]_n-[CH_2-C(CH_3)(COOH)]_m-$ can be prepared in a ratio from about 1:1 to 7:3. The mixture of polystyrene sulfonic acid and polymethacrylic acid can be prepared in a ratio of about 3:2. A solution of about 6 to 8% by weight co-polymer or mixture of the antistatic component and film-forming agent in ethyl alcohol is a preferred antistatic varnish.

The flexible laminae surfaces are coated with a thin, uniform layer of the antistatic varnish and air-dried for about 20 to 30 minutes. The desired thickness of antistatic coating is obtained by applying 2 to 3 varnish layers, each layer being dried independently.

EXAMPLE

A composite element according to the present invention may be used for damping vibrations. The device shown in FIG. 10 may be used to measure the damping decrement of a cantilever-fixed beam in a free oscillation regime. The composite element shown is composed of two 2 mm thick flexible laminae 1008 and 1007 each measuring 20×240 mm. First flexible lamina 1008 is made from a paper-based laminate. Alternating 1.5 mm wide electrodes 1005 are fixed on a surface of lamina 1008 such that the spacing between the electrodes is 1 mm. Second flexible lamina 1007 is made of polymethyl methacrylate. —[$CH_2$—$C(CH_3)$ ($COOCH_3$)$_n$]— A 20 μm thick antistatic varnish layer 1006 is applied to a surface of lamina 1007. The antistatic varnish 1006 comprises a co-polymer of a polyacrylamide isobutenyl sulfonic acid antistatic ingredient and a polymethacrylic acid film forming ingredient.

The varnish is prepared by dissolving the antistatic ingredient and film forming ingredient (6 to 8% by weight) in alcohol. The laminae surface is coated with this solution. Then the alcohol is removed by air drying. No substantial amount of alcohol is present in the dried varnish layer.

Between the electrodes 1005 and varnish-coated polymethyl methacrylate surface 1007 there is a 0.1 mm layer of electrorheological fluid 1001 comprising 63.5% chromium dihydrotripolyphosphate, 3.75% water, 8% AEROSIL, 2.5% polyethylene polyamine, 5.25% glycerol monooleate, and 17% vacuum oil VM-3 was used.

Figure 10:
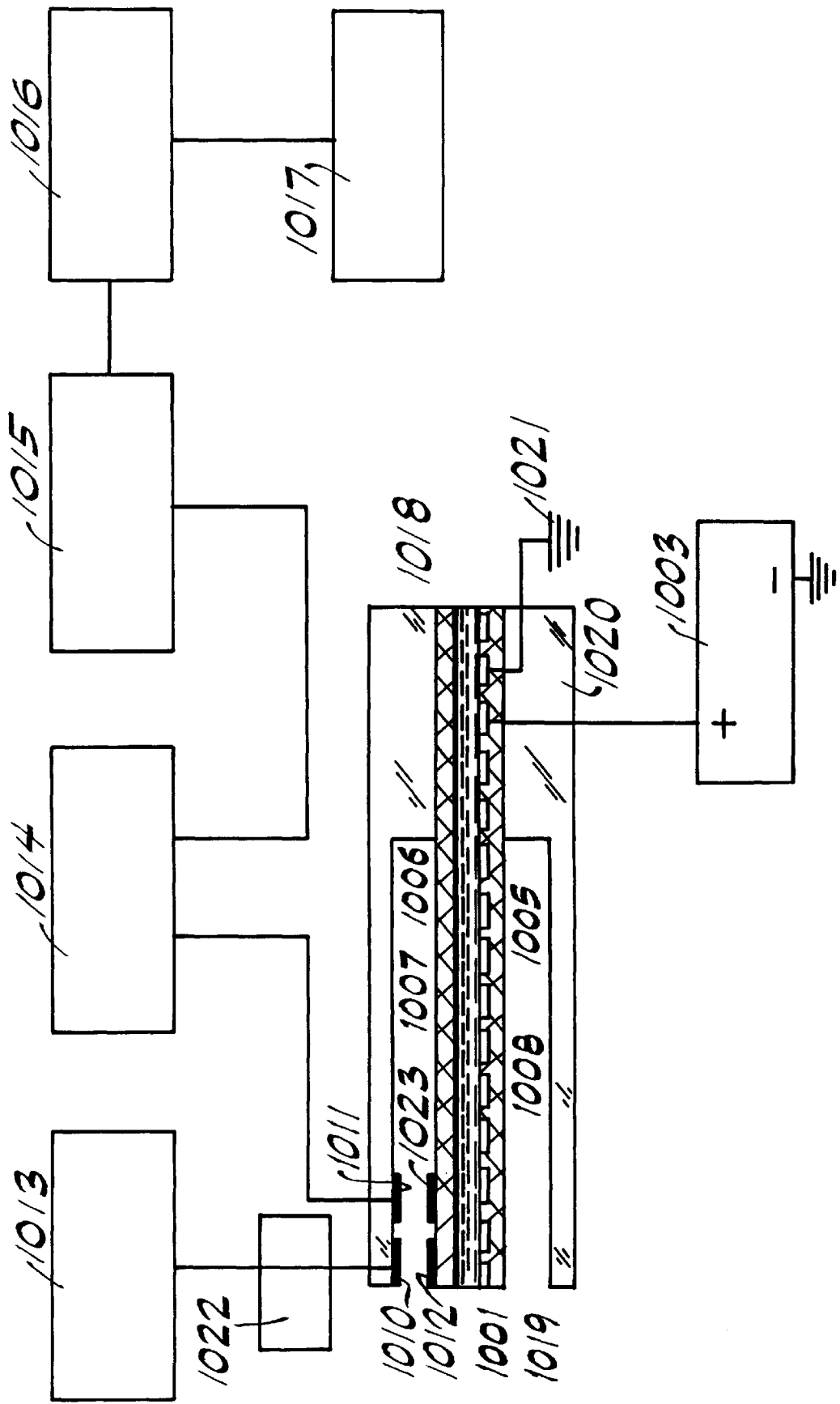
FIG. 10 is a cross-sectional view of another embodiment of the laminated composite element of the present invention.

A first end 1018 of the composite element is fixed by a structure 1020, as shown in FIG. 10. A second end 1019 of the composite element is free from attachment. Even electrodes 1005 are connected with a high-volt output of voltage source 1003, and odd electrodes 1005 are grounded to ground 1021. An electromagnet 1010 is mounted on a base of the device for oscillation excitation. The electromagnet 1010 is connected with a generator 1013 via an amplifier 1022. A first steel plate 1012 is installed opposite the electromagnet 1010 on a top surface of the composite element. An inductance displacement transducer 1011 is also mounted on the device base. A second steel plate 1023 is installed opposite the inductance transducer 1011 on the composite element.

A pulse from generator 1013 enters electromagnet 1010 causing the composite element end to deviate from its initial position by application of a magnetic force to first plate 1012, and consequently to the composite element, thereby initiating oscillation of the composite element. Inductance transducer 1011 generates a signal proportional to the amplitude of oscillation of the composite element. The signal is carried, via recording device 1014 and amplifier 1015 to the electronic oscilloscope 1016 and two-coordinate self-recorder 1017.

Three trials were made using the device shown in FIG. 10 and described herein. In the first trial, no electric field was applied to the electrorheological fluid. In the second trial, an electric field of 0.5 kV/mm from voltage source 1003 was applied to the electrorheological fluid. In the third trial, an electric field of 0.8 kV/mm from voltage source 1003 was applied to the electrorheological fluid. In trials 2 and 3, the electric field was first imposed before imposition of a mechanical pulse and remained constant during the trials. For comparative purposes, a device substantially as shown in FIG. 10, but having no electrorheological fluid between laminae 1007 and 1008, was constructed and tested in a similar manner. Variations in the amplitude of oscillation of the composite element over time were recorded for each of the four trials.

Figure 11:
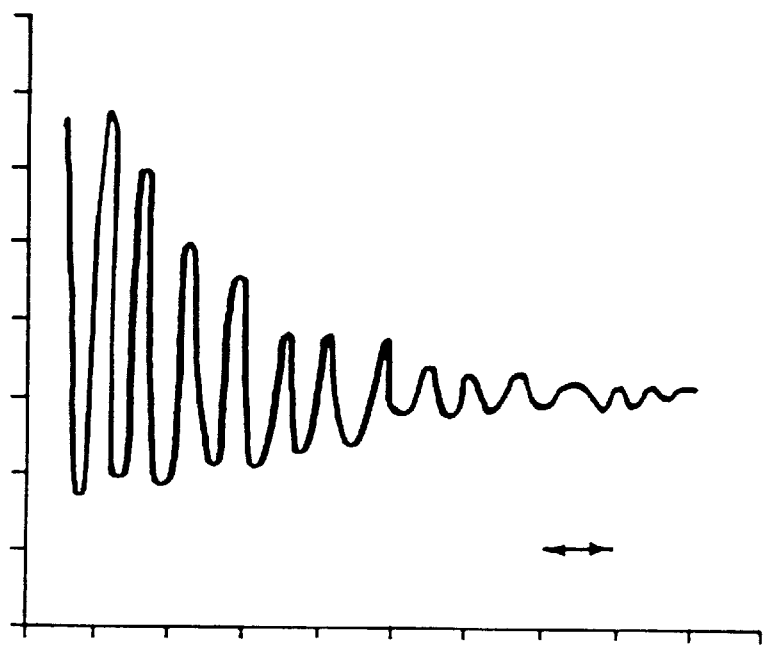
FIG. 11 is a graph of free oscillation amplitude of a comparative composite element without an electrorheological fluid layer.
Figure 12:
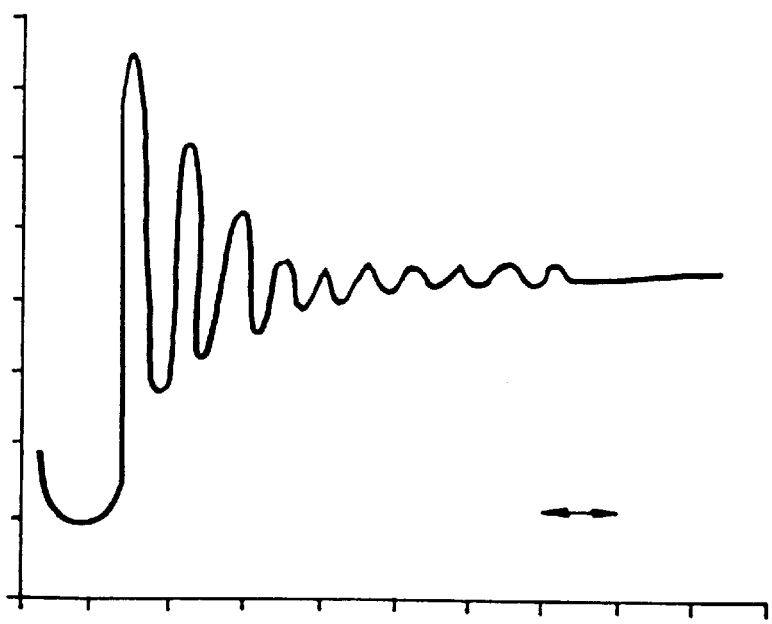
FIG. 12 is a graph of free oscillation amplitude of a composite element of the present invention where no electric field was present.
Figure 13:
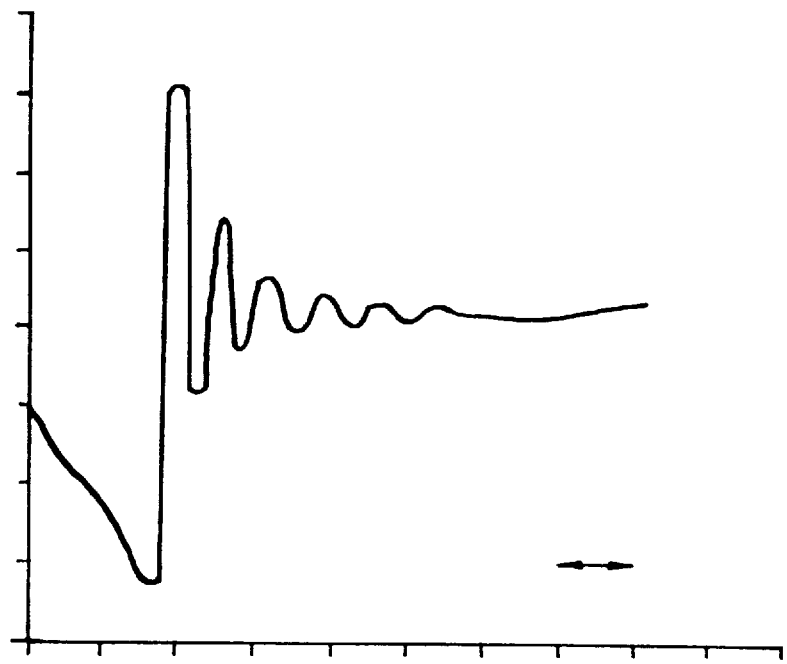
FIG. 13 is a graph of free oscillation amplitude of a composite element of the present invention in the presence of an electric field with a field strength of 0.5 kV/mm.
Figure 14:
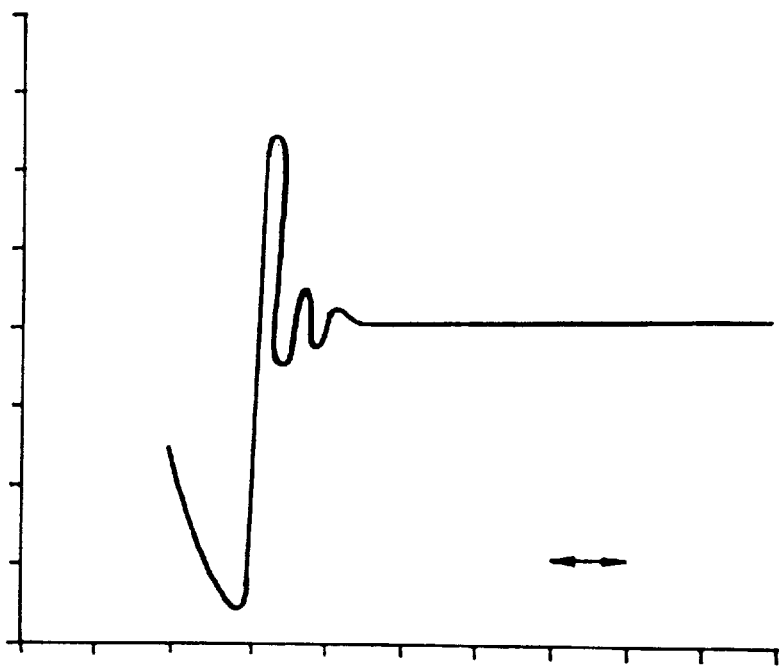
FIG. 14 is a graph of free oscillation amplitude of a composite element of the present invention in the presence of an electric field with a field strength of 0.8 kV/mm.

FIGS. 11 to 14 plot the oscilloscope records for the trials described. FIG. 11 plots the oscilloscope records of a free oscillation amplitude of a composite element having no electrorheological fluid between the laminae. FIG. 12 plots the oscilloscope records of a free oscillation amplitude of the composite element with an electrorheological fluid layer with no electric field over time. FIG. 13 plots the oscilloscope records of a free oscillation amplitude of the composite element with an electrorheological fluid layer at a field strength of 0.5 kV/mm over time. FIG. 14 plots the oscilloscope records of a free oscillation amplitude of the composite element with an electrorheological fluid layer at a field strength of 0.8 kV/mm over time. Comparison of the oscilloscope records in FIGS. 11 through 14 shows that imposing an electric field on an electrorheological fluid layer of the invention promotes more rapid damping of free oscillations of the composite element. A logarithmic decrement of damping of the composite element oscillations is determined by the formula:

$$\Delta = N^{-1} \cdot \ln\left(\frac{A_o}{A_N}\right)$$

where N is the number of oscillations for which an oscillation amplitude decreases from $A_O$ to $A_N$. The logarithmic damping decrement calculated for a composite element at field strength 0.8 kV/mm is increased 3.5 times over the damping decrement for a composite element where no field was present, which is equivalent to a 3.5-fold increase of the damping coefficient of a system.

We claim:

1. A composite element, comprising:
   at least one pair of flexible laminae including a first flexible lamina and a second flexible lamina, wherein the second flexible lamina of each pair of flexible laminae is located adjacent to the first flexible lamina with a first surface of the second flexible lamina facing a first surface of the first flexible lamina;
   a plurality of electrodes mounted, for at least one pair of flexible laminae on only one of the first surface of the first flexible lamina and the first surface of the second flexible lamina;
   an electrorheological fluid layer of generally uniform thickness between the first surface of the first flexible lamina and the first surface of the second flexible lamina; and
   at least one power source having two poles, each of said poles being connected to at least one of the electrodes.

2. A composite element according to claim 1, further comprising an additional layer of electrorheological fluid, wherein the at least one pair of flexible laminae further includes an additional flexible lamina located adjacent to one of the first flexible lamina and the second flexible lamina, wherein a first surface of the additional flexible lamina faces one of a second surface of the first flexible lamina and a second surface of the second flexible lamina, and wherein the additional layer of electrorheological fluid is between the first surface of the additional flexible lamina and one of the second surface of the first flexible lamina and the second surface of the second flexible lamina.

3. A composite element according to claim 1, wherein the plurality of electrodes contain an oxide film coating, and wherein the oxide-coated electrodes are coated with an anti-static varnish layer.

4. A composite element according to claim 3, wherein the anti-static coating is comprised of 6 to 8 weight % polymer sulfonic acids and a film-forming agent in ethyl alcohol, and the alcohol is removed after application of the coating to the surface.

5. A composite element according to claim 3, wherein the flexible laminae are fabricated from aluminum or aluminum alloys.

6. A composite element according to claim 1, wherein the first flexible lamina serves as a nonconducting dielectric base, and wherein the electrodes are alternating even and odd electrodes.

7. A composite element according to claim 6, wherein the alternating electrodes are subdivided into sections with each section having no fewer than two electrodes, and each section being supplied with a separate voltage source.

8. A composite element according to claim 1, wherein the first surface of the second flexible lamina is coated with an anti-static varnish layer.

9. A composite element according to claim 8, wherein the anti-static coating is comprised of 6 to 8 weight % polymer sulfonic acids and a film-forming agent in ethyl alcohol, and the alcohol is removed after application of the coating to the surface.

10. A composite element according to claim 1, wherein the second flexible lamina is fabricated from an electrically conductive material and coated with an oxide film.

11. A composite element according to claim 1, wherein a second surface of the first flexible lamina is coated with at least one of an oxide film and an anti-static varnish layer.

12. A composite element according to claim 1, wherein the plurality of electrodes are alternating electrodes and a second surface of the first flexible lamina has alternating electrodes mounted thereon.

13. The composite element according to claim 1, wherein the electrodes are fabricated from aluminum or aluminum alloys.

14. A composite element according to claim 13, wherein the electrodes are coated with an oxide film.

15. A composite element according to claim 1, wherein the second flexible lamina is fabricated from or coated with a dielectric material.

16. A composite element, comprising:

a first flexible lamina;

a second flexible lamina located adjacent to the first flexible lamina, wherein a first surface of the first flexible lamina faces a first surface of the second flexible lamina;

electrodes mounted on only one of the first surface of the first flexible lamina and the first surface of the second flexible lamina; and an electrorheological fluid layer of generally uniform thickness between the flexible laminae, said fluid comprising a suspension containing dispersed particles, an activator coated on said particles, a surfactant, and a non-conducting carrying fluid.

17. A composite element according to claim 16, wherein the electrorheological fluid is comprised of 10 to 55% bentonite clay, 9 to 35% AEROSIL, 8 to 17% polyethylene polyamine, 5 to 13% glycerol monooleate, and 18 to 27% vacuum oil VM-3.

18. A composite element according to claim 16, wherein the electrorheological fluid is comprised of 50 to 65% chromium dihydrotripolyphosphate, 1 to 6.5% water, 6 to 15% AEROSIL, 2 to 5% polyethylene polyamine, 4 to 8% glycerol monooleate, and 15 to 19% vacuum oil VM-3.

19. A composite element according to claim 16, wherein the electrorheological fluid is comprised of 10 to 20% $V_2O_5$, 20 to 30% AEROSIL, 10 to 15% polyethylene polyamine, 11 to 14% glycerol monooleate, and 19 to 23% vacuum oil VM-3.

20. A composite element according to claim 16, wherein the electrorheological fluid is comprised of 20 to 30% by weight $Co_3O_4$, 15 to 30% AEROSIL, 10 to 15% polyethylene polyamine, 11 to 14% glycerol monooleate, 18 to 22% vacuum oil VM-3.

21. A composite element according to claim 16, wherein the electrorheological fluid is comprised of 15 to 25% $CrO_2$, 15 to 30% AEROSIL, 10 to 15% polyethylene polyamine, 10 to 15% glycerol monooleate, and 19 to 23% vacuum oil VM-3.

22. A composite element, comprising:

a plurality of flexible electrically conductive laminae which serve as electrodes; and an electrorheological fluid positioned between the flexible laminae, wherein surfaces of the flexible laminae that contact the electrorheological fluid contain an oxide film coating, and wherein one of nonconducting particles and nonconducting fibers are introduced into the electrorheological fluid and wherein a diameter of the one of nonconducting particles and nonconducting fibers determines a minimum separation between opposed surfaces of adjacent ones of the flexible laminae.

* * * * *